United States Patent [19]

Dunnavant et al.

[11] 4,336,342

[45] Jun. 22, 1982

[54] COST REDUCTION OF ACID CURING FOUNDRY BINDERS WITH ALKYLATED AROMATIC HYDROCARBON SOLVENTS

[75] Inventors: William R. Dunnavant, Columbus; Young D. Kim, Dublin, both of Ohio

[73] Assignee: Ashland Oil, Inc., Ashland, Ky.

[21] Appl. No.: 244,521

[22] Filed: Mar. 16, 1981

[51] Int. Cl.$^3$ ................................................ C08K 5/01
[52] U.S. Cl. ............................... 523/144; 524/375; 524/475; 524/476; 524/593; 524/594; 524/596; 524/597; 524/598
[58] Field of Search ................ 260/33.6 R, DIG. 40, 260/29.3, 29.4 R; 528/249

[56] References Cited

U.S. PATENT DOCUMENTS

| | | | |
|---|---|---|---|
| 3,361,841 | 1/1968 | Lorentz et al. | 528/249 |
| 4,108,826 | 8/1978 | Anderson et al. | 528/249 |
| 4,176,114 | 11/1979 | Stewart et al. | 260/395 B |
| 4,197,385 | 4/1980 | Laitar | 528/249 |

*Primary Examiner*—Theodore E. Pertilla
*Attorney, Agent, or Firm*—Vernon F. Venne; Mary E. Picken

[57] ABSTRACT

Binder Compositions comprising a solution of furan foundry binders in an alkylated aromatic hydrocarbon solvent result in a more cost efficient binder. The cost efficiency is achieved without significant loss of physical properties of the foundry cores and molds which are formed using the binder. In instances the binder compositions of this invention exhibit improved physical properties.

10 Claims, No Drawings

COST REDUCTION OF ACID CURING FOUNDRY BINDERS WITH ALKYLATED AROMATIC HYDROCARBON SOLVENTS

BACKGROUND OF THE INVENTION

This invention relates to no-bake and cold box acid curable foundry binders. Furan resins are recognized for their utility as acid curable foundry binders. In the no-bake version these resins are mixed with sand and then are cured or catalyzed with liquid acids. In the cold box version acid curable resins are mixed with sand and then are cured with acids which are gases.

The furan binders which are useful in the foundry arts as binders for sand may in general be described as binders which contain furfuryl alcohol. Included within this description are furfuryl alcohol resins, furfuryl alcohol/formaldehyde resins, urea/formaldehyde/furfuryl alcohol resins and phenol/formaldehyde furfuryl alcohol resins. It has been found that alkylated aromatic hydrocarbons will perform as solvents for furan binders. The use of the alkylated aromatic hydrocarbon as solvents for furan binders results in a cost reduction of the ultimate furan binder without a significant reduction in the physical properties of the foundry cores and molds made using the binder. Casting quality is unaffected by the use of the furan binder solutions made using alkylated aromatic solvents.

BACKGROUND OF THE PRIOR ART

It is recognized that furan binders, i.e., foundry binders which contain furfuryl alcohol, are useful in the foundry industry to chemically bond sand to form foundry cores and molds. The furan binders are used in conjunction with a catalyst or curing agent which comprises an acid. Typical acids shown in the prior art used to cure or to catalyze the reaction include toluene sulfonic acid and benzene sulfonic acid. A number of United States patents concerning furan binders have issued. Included among these are U.S. Pat. Nos. 4,055,528; 3,639,654; 3,879,339; 3,917,558; 4,175,067; 4,215,206; 4,108,826; 4,033,925; 4,083,817; 4,017,461; 3,734,936; 3,448,069; 3,312,650; and 4,073,343. U.S. Pat. No. 4,018,826 contains a good summary of the general chemistry and compositions of furan binders. These patents would all appear to describe furan binders useful in the practice of this invention.

At present many furan binders are commercially available to the foundrymen. Examples of such binders are CHEM REZ brand binders available from Ashland Chemical Company. Furan binders are also manufactured by Acme Resin Corporation; Bakelite Limited; Borden Incorporated; Combustion Engineering, Incorporated; Core-Lube, Incorporated; Delta Oil Products Corporation and International Minerals and Chemicals Corporation. The physical properties of the foundry cores and molds made using these binders are good. The casting quality of metal articles which are formed using cores and molds made using furan binders is also good. However, a more cost efficient furan binder is very desirable. If the cost efficiency can be obtained without a significant deterioration of the physical properties and the casting quality a significant advance in the art of furan binders would be achieved.

DESCRIPTION OF THE INVENTION

This invention relates to cost efficient furan binders. By furan binders all furan resins used as foundry binders and which contain or are made using furfuryl alcohol are meant to be included. Such furan binders include furfuryl alcohol resins, furfuryl alcohol/formaldehyde resins, urea/formaldehyde/furfuryl alcohol resins and phenol/formaldehyde/furfuryl alcohol resins. These resins after being mixed with sand are cured with an acid catalyst. Typically these acids are in liquid form and are added to a mixture of furan binder and sand. The resultant mixture of sand/furan binder and acid catalyst is then shaped and allowed to cure. Alternatively, the furan binder can be cured by an acid which is formed in situ. One such process involves the combination of sulfur dioxide and a peroxide to form sulfuric acid. U.S. Pat. Nos. 3,879,339; 3,008,205; 3,639,654 and 3,145,438 are illustrative of the in situ catalysis of furan binders.

The furan binder can be used in range from 0.75% to 10% based on the weight of sand. The binder weight includes any solvents as well as the binding chemical itself. The catalyst level can range from 10% to 75% based on the weight of the binder. The amount of catalyst used will, of course, determine how rapidly the binder will cure.

It has been discovered that alkylated aromatic hydrocarbons are suitable solvents for furan binders. Furan binders can be diluted with the alkylated aromatic hydrocarbon solvents and the resultant solutions cured with an acid catalyst to form foundry cores and molds. Usually, the foundry cores and molds exhibit physical properties which are equivalent to and in many instances superior to the standard commercially available furan binders on the market today. Further, depending on the particular furan binder which is combined with the alkylated aromatic hydrocarbon solvent, up to 30% solvent can be added without a significant deterioration of the physical properties of the core and mold or the casting quality of the cast metal product which is formed and shaped using the mold and core. This feature is considered to be significant and surprising in that a significant proportion of the binding material, i.e., the furan binder, is being replaced by a non-binding material, i.e., the alkylated aromatic hydrocarbon solvent. However, at equivalent binder levels of undiluted furan binder and of furan binder diluted with an alkylated aromatic hydrocarbon the physical properties and the casting qualities are not significantly deteriorated, are often equivalent and in some cases show improvement.

The alkylated aromatic hydrocarbon solvents which are useful in combination with standard furan binders are the lower alkyl substituted benzenes. Lower alkyl substituted benzene solvents have the formula

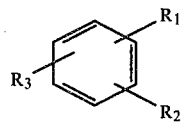

wherein $R_1$, $R_2$ and $R_3$ are selected from the group consisting of H, lower alkyl and lower alkoxy and wherein the solvent includes mixtures of substituted benzenes. The lower alkyl groups may have as many as six carbons and include groups such as methyl, ethyl, propyl, isopropyl, butyl and isobutyl. Methoxy groups are among the lower alkoxy groups. Lower alkyl substituted napthalenes are also useful as furan binder solvents.

The alkylated aromatic hydrocarbon solvents which are found useful in combination with standard furan binders include the following: toluene, xylene, cumene (isopropylbenzene), pseudo cumene (1,2,4-trimethylbenzene), 1-methyl-3-ethyl-benzene, ethylbenzene, methylnaphthalene, t-butylbenzene, 1,1-di(orthoxylyl)ethane, para-diisopropylbenzene and meta-diisopropylbenzene. Among the preferred solvents is cumene which is effective at 5, 10 and 20% levels. Pseudo cumene, xylene, ethylbenzene, methoxybenzene and toluene are useful at 10% by weight in combination with 80% by weight furan resin. Blends of alkylated aromatic hydrocarbons are particularly useful in this invention. One such blend is HS-10 available from Ashland Chemical Company. The analysis of HS-10 shows that it is composed of 27% trimethylbenzene, 20% 1-methyl-3-ethyl-benzene, 8% 1-methyl-4-ethyl-benzene, 8% 1-methyl-2-ethyl-benzene, 7% 1,3,5-trimethylbenzene, 6% o-xylene, 5% 1,2,3-trimethylbenzene, 3% m-xylene, 3% isopropylbenzene and 13% other mono-alkylbenzenes.

The amount of alkylated aromatic hydrocarbon solvent which can be used ranges up to 30% of the furan binder. The binder is considered as the furan resin and all solvents. To some extent the amount of solvent is dependent upon the nature of the furan binder. For example, as the water content of the furan binder increases, in general, the amount of solvent which can be added without significant deterioration of core and mold properties is less. It has been found that up to 30% of solvent can be added to a furan binder and the resultant binder solution be used to produce sand cores and molds which have physical properties which are not significantly different than the physical properties which would be formed by using the undiluted furan binder in the same binder percentage based on the amount of sand. By significant deterioration of physical properties applicants are indicating a reduction in tensile strength or in humidity resistance which will no longer allow the foundry binder to serve this function and to produce cores and molds which are useful to the foundrymen without undue effort or special handling on the part of the foundrymen.

The present binder is further illustrated by the following examples in which, unless otherwise indicated, all parts are by weight and all percentages are weight percentages.

EXAMPLES 1, 2, 3 and 4 illustrate the preparation of furan resins known to be useful as foundry binders.

EXAMPLE 1

This example illustrates the preparation of a furan resin from a blend of furfuryl alcohol and resorcinol. To a three liter reaction flask equipped with a condenser 75.5 grams of furfuryl alcohol and 20.0 grams of Terate 203/furfuryl alcohol blend are added. The mixture is heated to 120° F. and 4.5 grams of resorcinol is added. After mixing for 30 minutes all of the resorcinol is in solution. The mixture is cooled to below 100° F. and 0.15 grams of silane, available as A1102 from Union Carbide or as AMEO technical grade from Kay Fries, is added. The resin prepared according to this example has the following properties: Refractive Index 1.4950 to 1.4980; Viscosity 0.25 stokes; Non-volatiles 11.0 to 14.5; pH 6.0 to 7.5.

Terate 203 is an aromatic polyester polyol available commercially from Hercules Incorporated under the trademark "TERATE" polyols. Terate 203 is an aromatic polyester polyol typically having about 9% hydroxyl content, less than about 1% methoxyl content, an acid number of 4.2, a moisture content of about 0.2%, a free diethylene glycol content of about 9%, an average functionality of 2.3, and viscosities of 30,000 cps at 25° C., 7,000 cps at 40° C. and 90 cps at 100° C. The Terate 203/furfuryl alcohol blend is made from 50 parts of Terate 203 and 50 parts of furfuryl alcohol.

EXAMPLE 2

This example illustrates the preparation of a furan binder by the reaction of furfuryl alcohol with a urea formaldehyde concentrate. A urea formaldehyde concentrate having a pH in the range of 8 to 8.5 is prepared from 1 mole of urea and 4.8 moles of formaldehyde. The analysis of the concentrate is 60% formaldehyde, 25% urea and 15% water. This urea formaldehyde concentrate in the amount of 34.20 grams is added to a three liter reaction flask equipped with a condenser along with 5.40 grams of methanol. Furfuryl alcohol in the amount of 34.67 grams, 10.11 grams of 50% formaldehyde and 0.57 grams triethylamine are then added. The pH of this mixture is between 6.5 and 7.5. The mixture is heated to 88° C. and held at 88° C. for 20 minutes. The pH is then adjusted with 0.85 grams of 25% formic acid so that it is between 5.1 and 5.3. This mixture is heated for 30 minutes at 100° C. After cooling to below 100° F., 0.15 grams of silane is added. The resin has the following properties: refractive index 1.4810 to 1.4830; maximum viscosity less than 0.22 stokes; non-volatiles 25.3%; pH 6.3. This furan binder has about 7% water and about 4% nitrogen.

EXAMPLE 3

This example illustrates the preparation of a furan binder having zero nitrogen and less than about 0.5% water. This binder is prepared by the reaction of furfuryl alcohol with paraformaldehyde. To a three liter reaction flask equipped with a condenser is added 60.99 grams furfuryl alcohol, 12.23 grams of xylene, 17.84 grams of 91% paraformaldehyde and 0.12 grams of 30% phosphoric acid. The mixture is heated to 120° C. and refluxed until all the paraformaldehyde dissolves. The pH is between 2.5 and 3.3. The mixture is cooled to 66° C. and 0.047 grams of paratoluene sulfonic acid (50%) is added. After mixing for 10 more minutes the pH is between 1 and 2. The condenser is set for azeotropic distillation and the mixture is gradually heated to reflux. The reflux is continued until the viscosity reaches 1.1 stokes. Eight grams of furfuryl alcohol is then added. The batch is cooled to 99° C., 0.061 grams of lead naphthenate is added, the mixture is cooled to 71° C. and 0.712 grams of 50% sodium hydroxide is then added. The resulting exotherm increases the temperature to about 94° C. The mixture is vacuum distilled until the viscosity of a sample is at the endpoint of 24 stokes. The vacuum is released and the resin cooled. When the temperature reaches 49° C., 36.8 grams of furfuryl alcohol and 0.25 grams of silane are added to 53.2 grams of the cooled resin. This resin has the following properties: maximum viscosity 0.85; refractive index 1.5120 to 1.5180; 1.0% water (maximum); 2.5% free formaldehyde (maximum); and 31 to 39% non-volatiles.

EXAMPLE 4

This example illustrates the preparation of a phenol/formaldehyde/furfuryl alcohol resin. To a three liter flask equipped with a condenser are added 18.91 grams of phenol, 36.56 grams of 50% formaldehyde and 0.15 grams of MgO. This mixture is agitated for 20 minutes; the pH is in the range of 7.7 to 8.1. The temperature is increased to 59°–61° C. and the mixture is held at that temperature for 60 minutes. The temperature is then increased to 80° C. and the mixture held at 80° C. for 105 minutes. Free formaldehyde at this point is between 10 and 13%. After cooling to 69° C., urea in the amount of 6.54 grams is added and the mixture is held at 65° C. for 30 minutes. After cooling to 45° C. the free formaldehyde is between 2 and 4%. The pH is adjusted with 0.73 grams of 30% phosphoric acid to between 5.7 and 5.9. The temperature is increased to 75° C. When the water tolerance reaches 100% the product is cooled. The pH is adjusted to 5.9 to 6.3 with 30% phosphoric acid or diethylamine. A vacuum is applied and the product is dehydrated to a viscosity of 10 to 12 stokes.

Furfuryl alcohol in the amount of 36.93 grams is added, the product is cooled to 30° C. and 0.25 grams of silane is added. The resin has the following properties: 3.25 to 3.75% nitrogen; 7 to 10% water; a maximum of 1% free formaldehydr; a pH of 5.5 to 6.5; 52.5 to 57.5% non-volatiles and a refractive index of 1.5160 to 1.5200.

EXAMPLE 5

This example illustrates the use of the alkylated aromatic solvents with the resins of Examples 1 to 4 and the preparation of foundry test specimens. Evaluation of the various solvents and resins is set forth in the following Tables.

The furan binders were diluted with varying amounts of alkylated aromatic hydrocarbon solvents.

The diluted resins of Examples 1, 2, 3 and 4 were used as foundry no-bake binders to form American Foundrymen's Society standard dogbone specimens for tensile strength tests using standard procedures. Wedron silica sand in the amount of 3000 grams was introduced into a Hobart paddle mixer and acid catalyst was added. The catalysts and catalyst levels are indicated in Tables 1 through 8 below. The sand and catalyst were mixed for two minutes. The diluted binders were added in the amount of 45 grams and mixed for two additional minutes. The mixed sands were dumped into a gang box containing twelve dogbone shapes and rammed uniformly.

Work time is defined according to the American Foundrymen's Society in the AFS Mold and Core Test Handbook as the period (minutes) after mixing during which acceptable cores can be made. Strip time is defined in the Handbook as the time interval (minutes) required to produce a core or mold which has become sufficiently hardened to enable it to be withdrawn from the core box without distortions. Tensile strength measurements were made at one, three and twenty-four hour intervals as indicated in the tables. The twenty-four plus one hour tensile strength measurement was made after the dogbones were exposed to 100% humidity for one hour.

Tables 1 through 8 illustrate the physical test results on dogbones prepared from furan binders diluted with alkylated aromatic hydrocarbons. Tables 1, 2 and 3 summarize the screening of various solvents. Tables 4 through 8 summarize studies of cumene, toluene and a blend of hydrocarbons.

EXAMPLE 6

This example illustrates metal casting results obtained using a furan binder and a furan binder diluted with a blend of alkylated aromatic hydrocarbons. A stepcone was prepared using the resin of Example 3, another used a binder prepared from 90% resin of Example 3 and 10% HS-10. The stepcones were poured in grey iron at 2700° F. More smoke was seen with the binder containing HS-10 solvent; however, casting characteristics were similar. Moderate veining and little penetration was seen on both castings.

Two erosion wedge cones were made on Wedron 5010 Silica sand using 1.5% binder of Example 3 and 1.5% binder of Example 3, 90% with 10% HS-10 solvent. The erosion wedges were poured in grey iron using a 16" sprue height. A trace amount of erosion was evident on the core prepared from Example 3 binder. No erosion was seen on the core prepared from Example 3 binder diluted with 10% HS-10 solvent.

TABLE 1

| SOLVENT TYPE | Control | HS 10 | | Ethylbenzene | | Methyl Naphthalene | Cumene |
|---|---|---|---|---|---|---|---|
| % Solvent | 0% | 10% | 20% | 10% | 20% | 10% | 10% |
| % Resin Ex. 2 | 100% | 90% | 80% | 90% | 80% | 90% | 90% |
| Work time/ | | | | | | | |
| Strip time (min) | 21/25 | 22/25 | 17/24 | 21/25 | 19/22 | 22/26 | 27/32 |
| Tensile Strength | | | | | | | |
| 1 hour | 110 | 168 | 145 | 118 | 145 | 83 | 207 |
| 3 hours | 380 | 433 | 302 | 353 | 293 | 218 | 283 |
| 24 hours | 442 | 388 | 310 | 430 | 315 | 330 | 362 |
| 24 hours + 1 | 352 | 367 | 267 | 358 | 258 | 230 | 282 |

Catalyst: paratoluene sulfonic acid 60% in water
Level: 40% based on binder
3000 grams sand require 45 grams binder, 18 grams catalyst

TABLE 2

| 90% Resin Example 2 10% Solvent | Control | Pseudo-cumene | Xylene | Cumene |
|---|---|---|---|---|
| Work time/ Strip time (min) | 17/26 | 18/26 | 17/27 | 19/25 |
| Tensile Strength | | | | |
| 1 hour | 195 | 235 | 288 | 282 |
| 3 hours | 270 | 305 | 307 | 250 |
| 24 hours | 323 | 280 | 417 | 467 |
| 24 + 1 hours | 425 | 375 | 393 | 475 |

Catalyst: benzenesulfonic acid (75% in water)
Level: 18% based on binder
Binder 45 grams on 3000 grams sand
3000 grams sand require 8.1 grams of this catalyst

TABLE 3

| 90% Resin Example 3 10% Solvent | Control | Xylene | Cumene | Isopropyl Alcohol | Cyclo-hexane | Hexane | Methoxy Benzene | Propylene Glycol | Diacetone Alcohol |
|---|---|---|---|---|---|---|---|---|---|
| Work time/Strip time (minutes) | 3/5 | 4/6 | 4/6 | 7/10 | 4/6 | 4/6 | 4/7 | 11/16 | 8/11 |
| Tensile Strength (psi) | | | | | | | | | |
| 1 hour | 398 | 332 | 295 | 412 | 337 | 308 | 338 | 133 | 142 |
| 3 hours | 500 | 290 | 332 | 470 | 425 | 335 | 508 | 463 | 507 |
| 24 hours | 465 | 352 | 462 | 565 | 453 | 358 | 492 | 598 | 633 |

Catalyst: benzene sulfonic acid (75% in water)
Level: 15% based on binder
3000 grams sand require 6.8 grams of this catalyst

TABLE 4

| % Binder Example 1 | 100 | 97.5 | 95 |
|---|---|---|---|
| % Cumene | 0 | 2.5 | 5.0 |
| Work time/Strip time (min) | 5/7 | 5/7 | 5/7 |
| Tensile Strength | | | |
| 1 hour | 395 | 372 | 330 |
| 3 hours | 557 | 600 | 475 |
| 24 hours | 588 | 625 | 567 |
| 24 + 1 hours | 297 | 318 | 310 |

Catalyst: toluene sulfonic acid (60% in water)
Level: 40% based on binder
3000 grams sand require 18 grams of this catalyst

TABLE 5

| % Binder Example 2 | 100 | 95 | 90 | 85 |
|---|---|---|---|---|
| % Cumene | 0 | 5 | 10 | 15 |
| Work time/Strip time (min) | 24/28 | 24/27 | 23/27 | 23/26 |
| Tensile Strength | | | | |
| 1 hour | 160 | 175 | 167 | 205 |
| 3 hours | 500 | 480 | 585 | 433 |
| 24 hours | 468 | 545 | 632 | 563 |
| 24 + 1 hours | 275 | 298 | 275 | 237 |

Catalyst: paratoluene sulfonic acid (60% in water)
Level: 40% based on binder
3000 grams sand require 18 grams of this catalyst

TABLE 6

| % Resin Example 2 | 100 | 95 | 90 | 80 |
|---|---|---|---|---|
| % Cumene | — | 5 | 10 | 20 |
| Work time/Strip time (min) | 18/25 | 20/29 | 21/29 | 21/26 |
| Tensile Strength (psi) | | | | |
| 1 hour | 217 | 315 | 263 | 243 |
| 3 hours | 337 | 375 | 350 | 427 |
| 24 hours | 405 | 480 | 425 | 413 |
| 24 + 1 hours | 375 | 310 | 308 | 257 |

Catalyst: benzene sulfonic acid (75% in water)
Level: 18% based on binder
3000 grams sand require 8.1 grams of this catalyst

TABLE 7

| % Resin Example 3 | 100 | 90 | 90 | 80 | 70 | 60 | 50 |
|---|---|---|---|---|---|---|---|
| % HS 10 Solvent | 0 | — | 10 | 20 | 30 | 40 | 50 |
| % Toluene | — | 10 | — | — | — | — | — |
| Work time/Strip time (min) | 5/7 | 4/7 | 6/8 | 5/7 | 4/6 | 5/7 | 4/9 |
| Tensile Strength (psi) | | | | | | | |
| 1 hour | 273 | 313 | 297 | 193 | 222 | 72 | 10 |
| 3 hours | 463 | 422 | 458 | 350 | 263 | 120 | 10 |
| 24 hours | 433 | 423 | 268 | 385 | 298 | 143 | 10 |
| 24 + 1 hours | 207 | 177 | 153 | 98 | 63 | 0 | |

Catalyst: paratoluene sulfonic acid (60% in water)
Level: 30% based on binder
3000 grams sand require 13.5 grams of this catalyst

TABLE 8

| % Resin Example 4 | 100 | 95 | 90 | 80 | 70 | 60 |
|---|---|---|---|---|---|---|
| HS 10 Solvent | — | 5 | 10 | 20 | 30 | 40 |
| Work time/Strip time (min) | 10/19 | 11/20 | 11/20 | 13/18 | 11/17 | 9/13 |
| Tensile Strength (psi) | | | | | | |
| 1 hour | 113 | 192 | 120 | 117 | 137 | 102 |
| 3 hours | 282 | 297 | 305 | 287 | 273 | 228 |
| 24 hours | 357 | 360 | 310 | 313 | 337 | 258 |

Catalyst: paratoluene sulfonic acid (60% in water)
Level: 30% based on binder
3000 grams sand require 13.5 grams of this catalyst

What is claimed is:

1. A foundry binder comprising a furan resin and an acid catalyst wherein said resin is a solution of 70% to 95% by weight furan resin and 5 to 30% by weight of a substituted benzene solvent having the formula

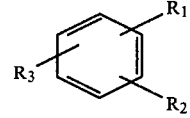

wherein $R_1$, $R_2$ and $R_3$ are selected from the group consisting of H, lower alkyl and lower alkoxy and wherein the solvent includes mixtures of such substituted benzenes.

2. A foundry binder as recited in claim 1 wherein said solvent is a mixture comprising trimethylbenzene, 1-methyl-3-ethyl-benzene, 1-methyl-4-ethyl-benzene, 1-methyl-2-ethyl-benzene, 1,3,5-trimethylbenzene, o-xylene, 1,2,3-trimethylbenzene, m-xylene and isopropylbenzene.

3. A foundry binder as recited in claim 1 wherein said solvent is selected from the group consisting of cumene, pseudo cumene, xylene, ethylbenzene, methoxybenzene and toluene.

4. A foundry binder comprising a furan resin and an acid catalyst wherein said resin is a solution of about 95% by weight of a furfuryl alcohol/resorcinol blend and about 5% cumene.

5. A foundry binder comprising a furan resin and an acid catalyst wherein said resin is a solution of about 80% by weight of a urea/formaldehyde/furfuryl alcohol resin and about 20% cumene.

6. A foundry binder comprising a furan resin and an acid catalyst wherein said resin is a solution of about 90% by weight of a urea/formaldehyde/furfuryl alcohol resin and about 10% by weight of a solvent selected from the group consisting of pseudo cumene, xylene and ethylbenzene.

7. A foundry binder comprising a furan resin and an acid catalyst wherein said resin is a solution of about 90% by weight of a urea/formaldehyde/furfuryl alcohol resin and about 10% by weight of a mixture of trimethylbenzene, 1-methyl-3-ethyl-benzene, 1-methyl-4-ethylbenzene, 1-methyl-2-ethyl-benzene, 1,3,5-trimethylbenzene, o-xylene, 1,2,3-trimethylbenzene, m-xylene and isopropylbenzene.

8. A foundry binder comprising a furan resin and an acid catalyst wherein said resin is a solution of about 70% by weight of a furfuryl alcohol/formaldehyde resin having less than 0.5% water and about 30% by weight of a mixture of trimethylbenzene, 1-methyl-3-ethyl-benzene, 1-methyl-4-ethyl-benzene, 1-methyl-2-ethyl-benzene, 1,3,5-trimethylbenzene, o-xylene, 1,2,3-trimethylbenzene, m-xylene and isopropylbenzene.

9. A foundry binder comprising a furan resin and an acid catalyst wherein said resin is a solution of about 90% by weight of a furfuryl alcohol/formaldehyde resin having less than 0.5% water and about 10% of a solvent selected from the group consisting of xylene, 1,1-di(orthoxylyl) ethane, cumene, methoxybenzene and toluene.

10. A foundry binder comprising a furan resin and an acid catalyst wherein said resin is a solution of about 70% by weight of a phenol/formaldehyde/furfuryl alcohol resin and about 30% by weight of a mixture of trimethylbenzene, 1-methyl-3-ethyl-benzene, 1-methyl-4-ethyl-benzene, 1-methyl-2-ethyl-benzene, 1,3,5-trimethylbenzene, o-xylene, 1,2,3-trimethylbenzene, m-xylene and isopropylbenzene.

* * * * *